(12) United States Patent
Okuyama et al.

(10) Patent No.: US 11,243,446 B2
(45) Date of Patent: *Feb. 8, 2022

(54) DISPLAY DEVICE

(71) Applicant: Japan Display Inc., Minato-ku (JP)

(72) Inventors: Kentaro Okuyama, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,529

(22) Filed: Feb. 19, 2021

(65) Prior Publication Data

US 2021/0200046 A1 Jul. 1, 2021

Related U.S. Application Data

(63) Continuation of application No. 16/357,500, filed on Mar. 19, 2019, now Pat. No. 10,955,714.

(30) Foreign Application Priority Data

Mar. 23, 2018 (JP) .............................. JP2018-056406

(51) Int. Cl.
*G02F 1/1362* (2006.01)
*G02F 1/1334* (2006.01)
*G02F 1/1335* (2006.01)

(52) U.S. Cl.
CPC ...... *G02F 1/136286* (2013.01); *G02F 1/1334* (2013.01); *G02F 1/133553* (2013.01); *G02F 1/136209* (2013.01); *G02F 1/136277* (2013.01); *G02F 2201/121* (2013.01); *G02F 2201/123* (2013.01)

(58) Field of Classification Search
CPC ......... G02F 1/136286; G02F 1/136277; G02F 1/136209; G02F 1/1334; G02F 1/133553; G02F 2201/121; G02F 2201/123
USPC ...................................... 349/42–46, 110–111
See application file for complete search history.

(56) References Cited

U.S. PATENT DOCUMENTS

| | | |
|---|---|---|
| 6,583,830 B2 | 6/2003 | Yasukawa |
| 9,983,437 B2 | 5/2018 | Okuyama |
| 10,955,714 B2* | 3/2021 | Okuyama ............. G02F 1/1334 |
| 2011/0096261 A1 | 4/2011 | Kobayashi et al. |
| 2011/0109663 A1 | 5/2011 | Uchida et al. |

(Continued)

FOREIGN PATENT DOCUMENTS

| | | |
|---|---|---|
| JP | 2011-095407 | 5/2011 |
| JP | 5467389 | 4/2014 |

(Continued)

*Primary Examiner* — Charles S Chang
(74) *Attorney, Agent, or Firm* — Oblon, McClelland, Maier & Neustadt, L.L.P.

(57) ABSTRACT

According to one embodiment, a display device includes a first substrate, a second substrate and a liquid crystal layer. The first substrate includes a first insulating substrate, a scanning line, a signal line, a switching, and a pixel electrode. The liquid crystal layer includes a polymer in a shape of a streak and a liquid crystal molecule. The scanning line includes a conductive layer located between the first insulating substrate and the liquid crystal layer, and a first reflective layer located between the first insulating substrate and the conductive layer and having a reflectance higher than a reflectance of the conductive layer.

18 Claims, 13 Drawing Sheets

(56) References Cited

U.S. PATENT DOCUMENTS

| | | | |
|---|---|---|---|
| 2014/0291672 A1* | 10/2014 | Yamazaki | H01L 27/1225 257/43 |
| 2015/0187800 A1 | 7/2015 | Park | |
| 2016/0070047 A1 | 3/2016 | Okuyama et al. | |
| 2016/0116768 A1 | 4/2016 | Okuyama et al. | |
| 2016/0320666 A1 | 11/2016 | Kim et al. | |
| 2017/0219840 A1 | 8/2017 | Okuyama | |
| 2017/0236891 A1 | 8/2017 | Koshihara et al. | |
| 2017/0276999 A1 | 9/2017 | Yoon | |
| 2017/0285420 A1 | 10/2017 | Okuyama et al. | |
| 2018/0074356 A1 | 3/2018 | Okuyama | |

FOREIGN PATENT DOCUMENTS

| | | |
|---|---|---|
| JP | 2016-085452 | 5/2016 |
| JP | 2016-212390 | 12/2016 |
| JP | 2017-146369 | 8/2017 |

\* cited by examiner

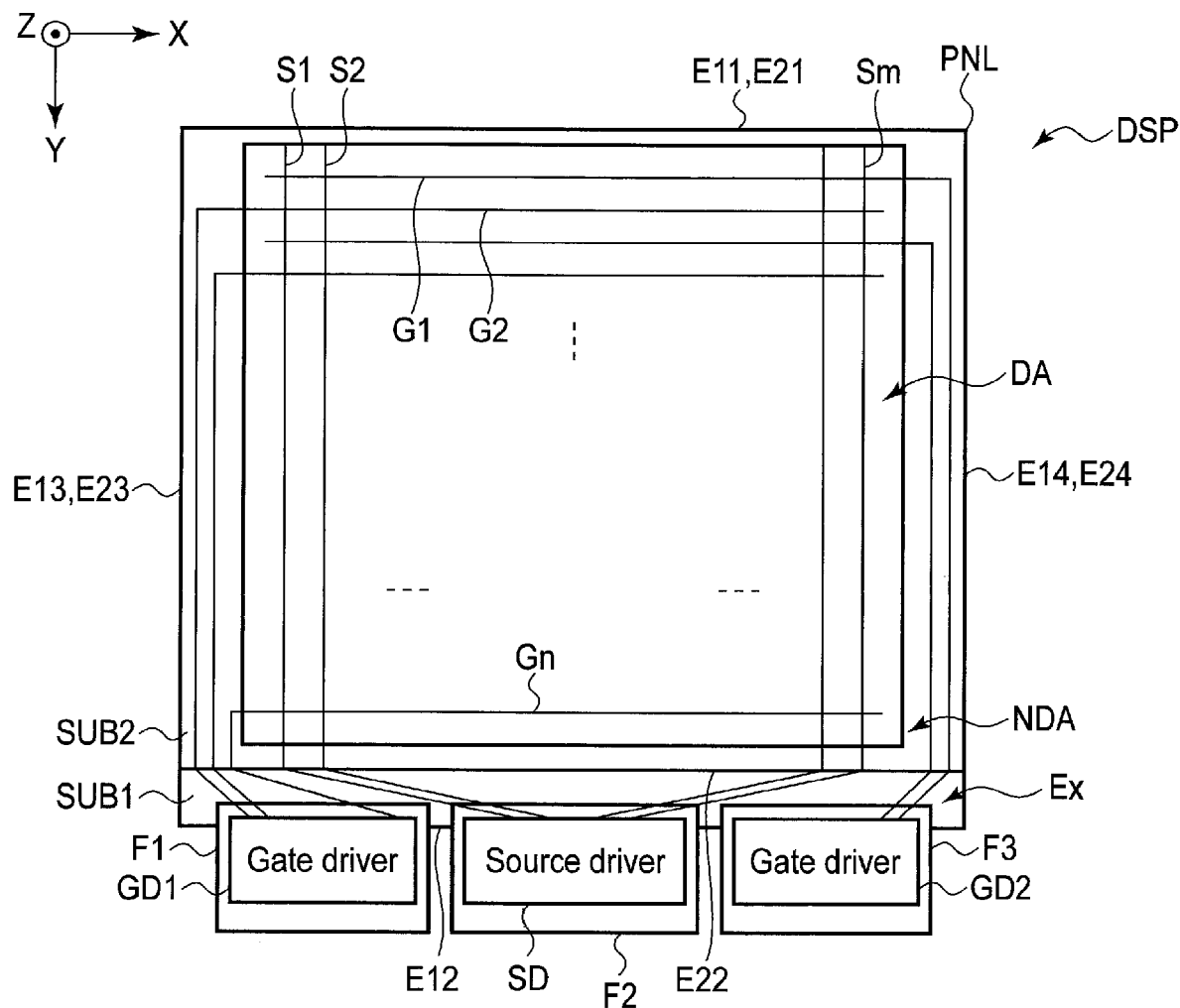
F I G. 1

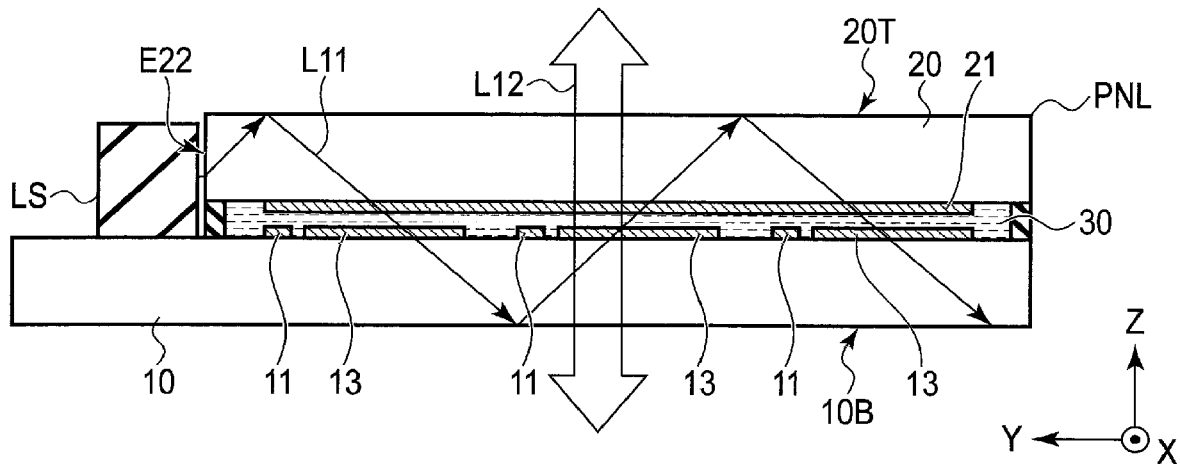
F I G. 7
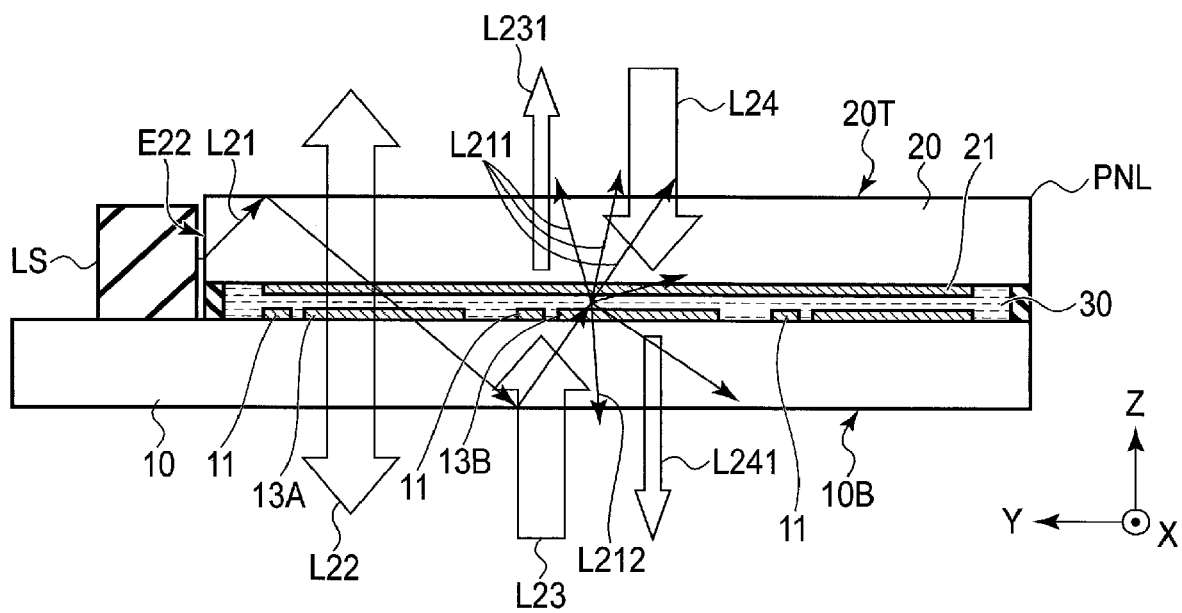
F I G. 8

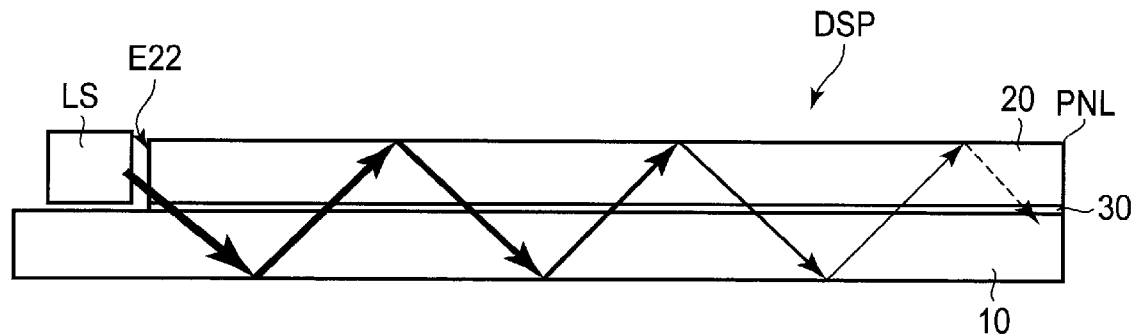
F I G. 15
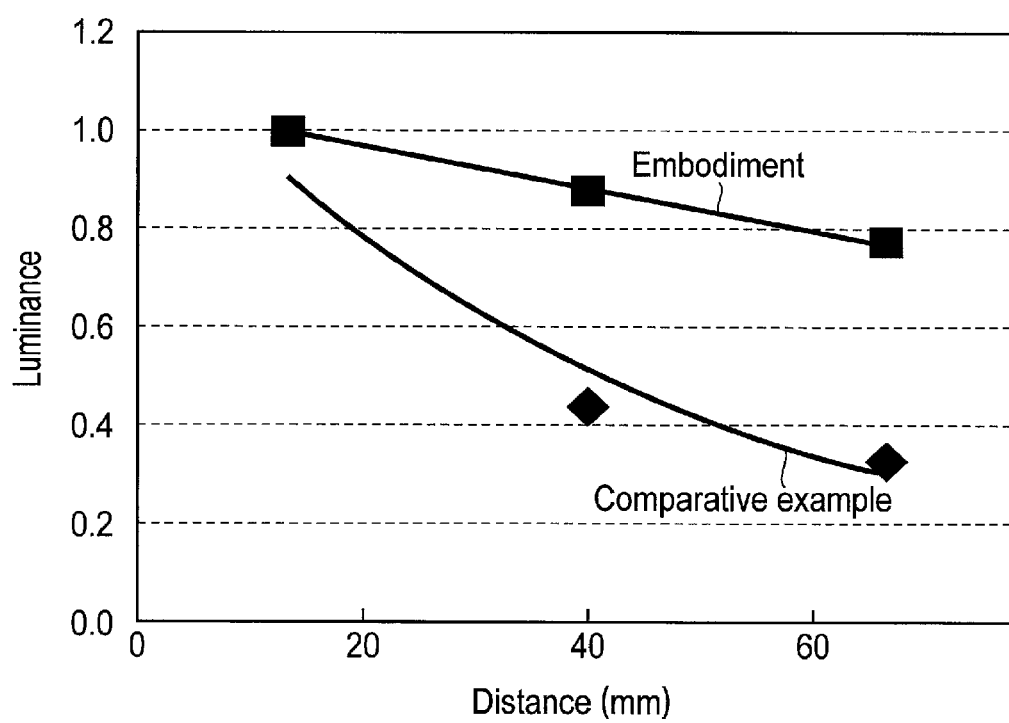
F I G. 16

DISPLAY DEVICE

CROSS-REFERENCE TO RELATED APPLICATIONS

This application is a continuation of and claims the benefit of priority under 35 U.S.C. § 119 from U.S. application Ser. No. 16/357,500 filed Mar. 19, 2019, and claims the benefit of priority under 35 U.S.C. § 120 from Japanese Patent Application No. 2018-056406 filed Mar. 23, 2018, the entire contents of each of which are incorporated herein by reference.

FIELD

Embodiments described herein relate generally to a display device.

BACKGROUND

Recently, various display devices have been proposed. In one example, a display device which comprises a color filter between a polymer dispersed liquid crystal layer and a reflective layer and realizes color display by using light reflected off the reflective layer is disclosed. In another example, a mirror-type display device which comprises a reflective layer on an upper substrate, provides a mirror function by the reflective layer and also provides a display function of displaying an image in an opening area of the reflective layer is disclosed. In yet another example, an electro-optical device which comprises a reflective layer between a driving transistor and a light-emitting element and prevents light from the light-emitting element from being emitted to the driving transistor is disclosed.

On the other hand, an illumination device which uses polymer dispersed liquid crystal capable of switching between a scattering state of scattering incident light and a transmitting state of transmitting incident light is proposed.

Incidentally, degradation of display quality needs to be suppressed in the display device using polymer dispersed liquid crystal.

BRIEF DESCRIPTION OF THE DRAWINGS

FIG. 1 is a plan view showing a configuration example of a display device DSP according to the present embodiment.

FIG. 7 is a cross-sectional view showing a display panel PNL in a case where the liquid crystal layer 30 is in the off state.

FIG. 8 is a cross-sectional view showing the display panel PNL in a case where the liquid crystal layer 30 is in the on state.

FIG. 15 is an explanatory diagram showing the way the light emitted from a light-emitting element LS propagates through the display panel PNL.

FIG. 16 is a graph showing the result of luminance measurement in the display device DSP of the present embodiment and a display device of a comparative example.

DETAILED DESCRIPTION

Figure 2:
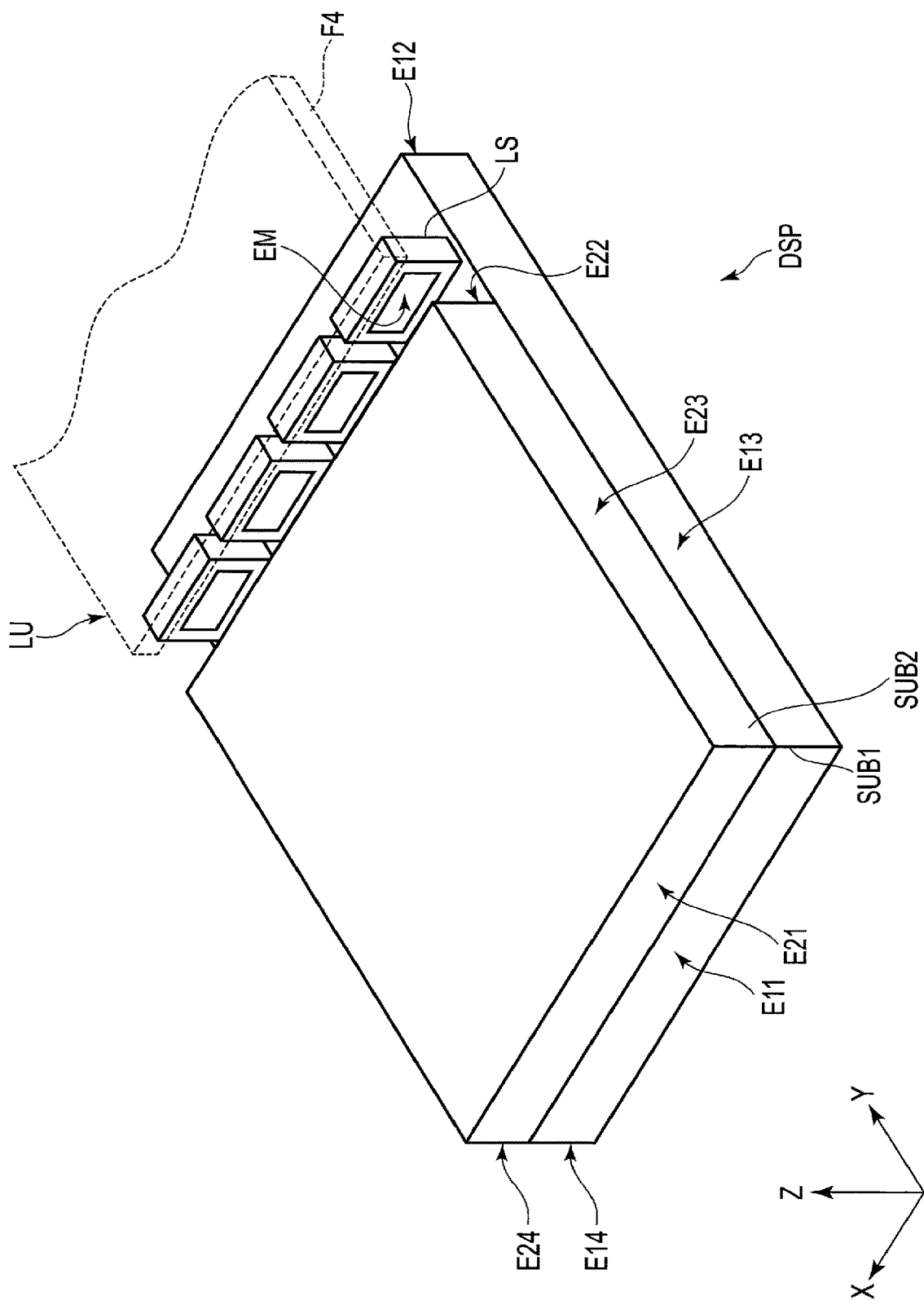
FIG. 2 is a perspective view showing the display device DSP shown in FIG. 1.

In general, according to one embodiment, a display device comprises a first substrate, a second substrate and a liquid crystal layer. The first substrate comprises a first insulating substrate, a scanning line, a signal line intersecting the scanning line, a switching element electrically connected to the scanning line and the signal line, and a pixel electrode electrically connected to the switching element. The second substrate comprises a second insulating substrate and a common electrode opposed to the pixel electrode. The liquid crystal layer is provided between the first substrate and the second substrate and includes a polymer in a shape of a streak and a liquid crystal molecule. The scanning line comprises a conductive layer located between the first insulating substrate and the liquid crystal layer, and a first reflective layer located between the first insulating substrate and the conductive layer and having a reflectance higher than a reflectance of the conductive layer.

According to another embodiment, a display device comprises a first substrate, a second substrate and a liquid crystal layer. The first substrate comprises a first insulating substrate, a conductive layer and a reflective layer. The second substrate comprises a second insulating substrate. The liquid crystal layer is provided between the first substrate and the second substrate and includes a polymer in a shape of a streak and a liquid crystal molecule. The conductive layer is located between the first insulating substrate and the liquid crystal layer. The reflective layer is located between the first insulating substrate and the conductive layer and has a reflectance higher than a reflectance of the conductive layer.

According to yet another embodiment, a display device comprises a first substrate, a second substrate and a liquid crystal layer. The first substrate comprises a first insulating substrate, a switching element and a pixel electrode electrically connected to the switching element. The second substrate comprises a second insulating substrate and a common electrode opposed to the pixel electrode. The liquid crystal layer is provided between the first substrate and the second substrate and includes a polymer in a shape of a streak and a liquid crystal molecule. The switching element comprises a gate electrode located between the first insulating substrate and the liquid crystal layer, a semiconductor layer located between the gate electrode and the liquid crystal layer, and a source electrode and a drain electrode which are in contact with the semiconductor layer. The gate electrode comprises a reflective layer opposed to the first insulating substrate, and a conductive layer stacked on the reflective layer and opposed to the semiconductor layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a plan view showing a configuration example of a display device DSP according to the present embodiment. A first direction X, a second direction Y and a third direction Z are orthogonal to each other in the drawing but may intersect at an angle other than 90 degrees. In the present specification, a position on the leading end side of an arrow indicating the third direction Z may be referred to as "above" and a position on the side opposite to the leading end of the arrow may be referred to as "below" in some cases. In the case of "a second member above a first member" and the case of "a second member below a first member", the second member may be in contact with the first member or may be away from the first member. In addition, an observation position at which the display device DSP is observed is assumed to be located on the leading end side of the arrow indicating the third direction Z, and a view from the observation position toward an X-Y plane defined by the first direction X and the second direction Y is referred to as planar view.

In the present embodiment, a display device employing polymer dispersed liquid crystal will be described as an example of the display device DSP. The display device DSP comprises a display panel PNL and wiring substrates F1 to F3. The display device DSP further comprises a light source unit (not shown).

The display panel PNL comprises a first substrate SUB1 and a second substrate SUB2. The first substrate SUB1 and the second substrate SUB2 are formed in the shape of a flat plate parallel to the X-Y plane. The first substrate SUB1 and the second substrate SUB2 overlap each other in planar view. The display panel PNL comprises a display area DA on which an image is displayed and a frame-shaped non-display area NDA which surrounds the display area DA. The display area DA is located in an area in which the first substrate SUB1 and the second substrate SUB2 overlap each other. The display panel PNL comprises n scanning lines G (G1 to Gn) and m signal lines S (S1 to Sm) in the display area DA. Each of n and m is a positive integer, and n may be equal to or different from m. The scanning lines G extend in the first direction X and are spaced apart and arranged in the second direction Y. The signal lines S extend in the second direction Y and are spaced apart and arranged in the first direction X.

The first substrate SUB1 comprises end portions E11 and E12 extending in the first direction X and end portions E13 and E14 extending in the second direction Y. The second substrate SUB2 comprises end portions E21 and E22 extending in the first direction X and end portions E23 and E24 extending in the second direction Y. In the example illustrated, the end portions E11 and E21, the end portions E13 and E23, and the end portions E14 and E24 overlap, respectively, in planar view. However, these end portions do not necessarily overlap. The end portion E22 is located between the end portion E12 and the display area DA in planar view. The first substrate SUB1 comprises an extension portion Ex between the end portion E12 and the end portion E22.

The wiring substrates F1 to F3 are connected to the extension portion Ex and are arranged in this order in the first direction X. The wiring substrate F1 comprises a gate driver GD1. The wiring substrate F2 comprises a source driver SD. The wiring substrate F3 comprises a gate driver GD2. The wiring substrates F1 to F3 may be replaced with a single wiring substrate.

The signal lines S are drawn to the non-display area NDA and are connected to the source driver SD. The scanning lines G are drawn to the non-display area NDA and are connected to the gate drivers GD1 and GD2. In the example illustrated, odd-numbered scanning lines G are drawn between the end portion E14 and the display area DA and are connected to the gate driver GD2. In addition, even-numbered scanning lines G are drawn between the end portion E13 and the display area DA and are connected to the gate driver GD1. The relationship in connection between the gate drivers GD1 and GD2 and the scanning lines G is not limited to the example illustrated.

FIG. 2 is a perspective view showing the display device DSP shown in FIG. 1. Illustration of the wiring substrates F1 to F3 is omitted. A light source unit LU is located on the first substrate SUB1 and is disposed along the end portion E22. The light source unit LU comprises light-emitting elements LS as light sources and a wiring substrate F4 shown by a dotted line. The light-emitting elements LS are, for example, light-emitting diodes. The light-emitting elements LS are spaced apart and arranged in the first direction X. Each of the light-emitting elements LS is connected to the wiring substrate F4. The light-emitting elements LS are located between the first substrate SUB1 and the wiring substrate F4. Each of the light-emitting elements LS comprises a light-emitting portion EM. The light-emitting portion EM faces the end portion E22. The light-emitting portion EM may be in contact with the end portion E22. In addition, an air layer, an optical element or the like may be interposed between the light-emitting portion EM and the end portion E22. The end portion E22 corresponds to an incidence portion on which the light emitted from the light-emitting portion EM is made incident.

Figure 3:
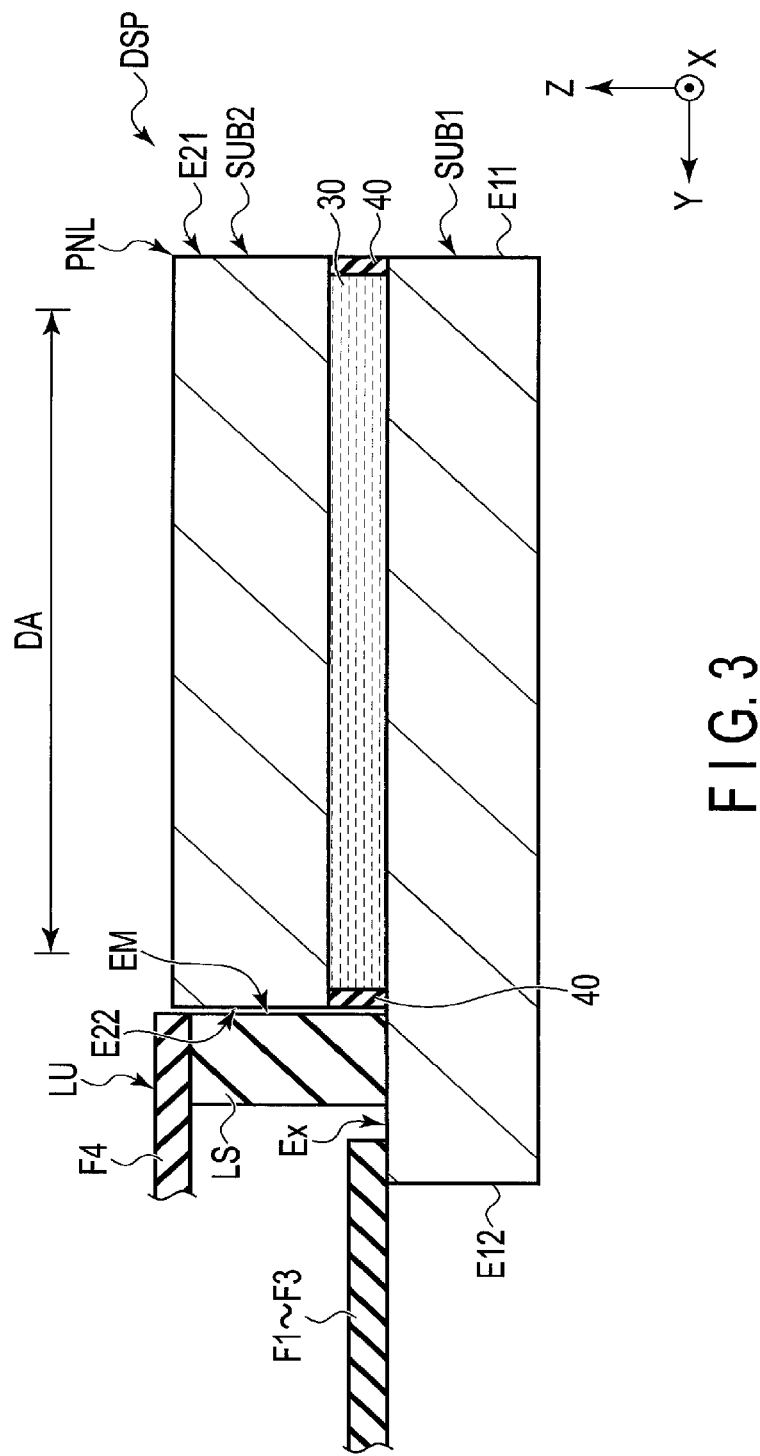
FIG. 3 is a cross-sectional view showing the display device DSP shown in FIG. 1.

FIG. 3 is a cross-sectional view showing the display device DSP shown in FIG. 1. Only main portions in the cross-section of the display device DSP in a Y-Z plane defined by the second direction Y and the third direction Z will be described. The display panel PNL comprises a liquid crystal layer 30 held between the first substrate SUB1 and the second substrate SUB2. The first substrate SUB1 and the second substrate SUB2 are bonded together by a sealant 40.

In the example illustrated, the light-emitting element LS is located between the extension portion Ex and the wiring substrate F4. In addition, the light-emitting element LS is located between the wiring substrates F1 to F3 and the second substrate SUB2. The light-emitting element LS emits light from the light-emitting portion EM to the end portion E22. The light made incident from the end portion E22 propagates through the display panel PNL in the direction opposite to an arrow indicating the second direction Y as will be described later. The light-emitting element LS may be opposed to the end portions of both of the first substrate SUB1 and the second substrate SUB2 and may be opposed to, for example, the end portions E11 and E21.

Figure 4:
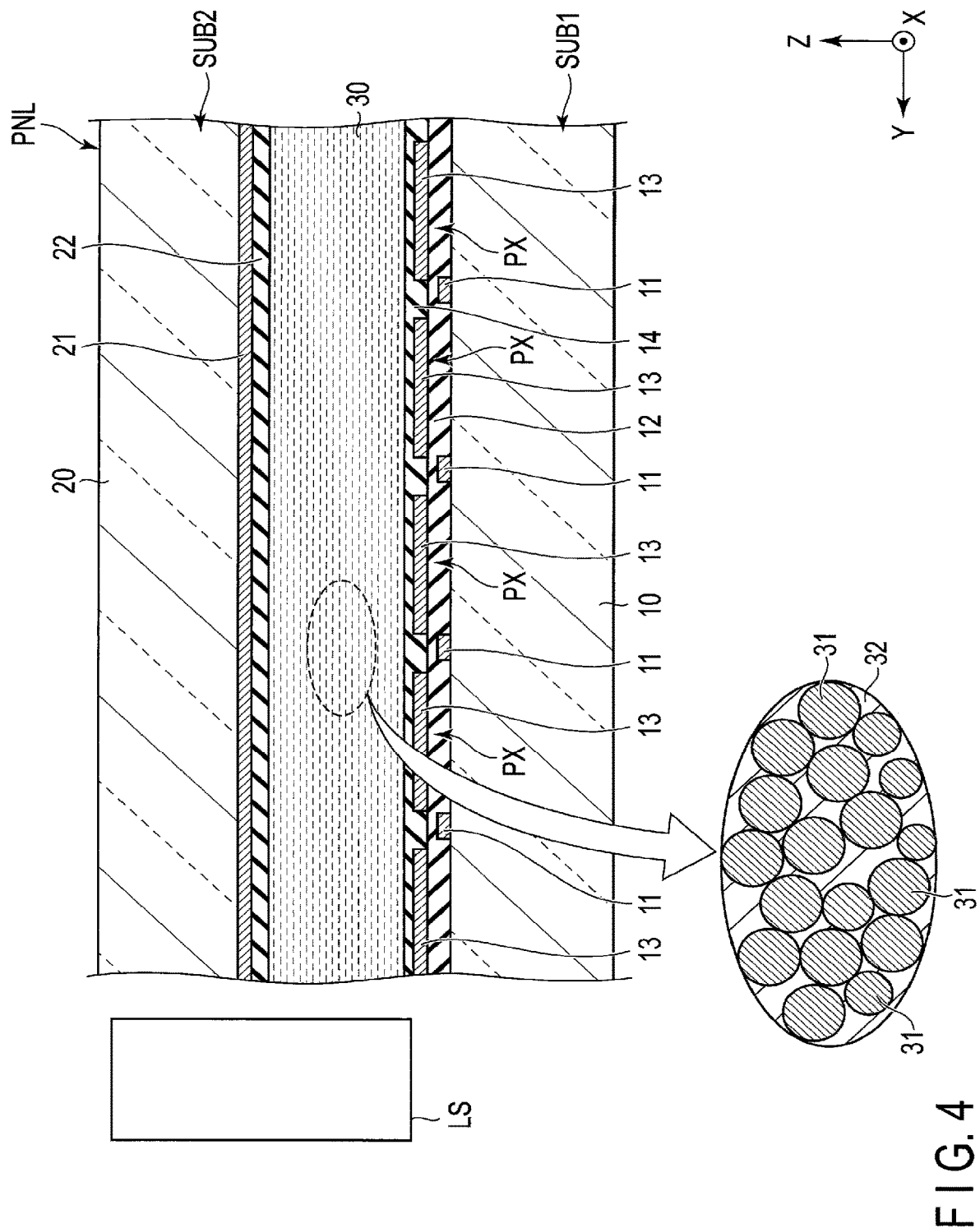
FIG. 4 is a cross-sectional view showing a configuration example of the display panel PNL shown in FIG. 3.

FIG. 4 is a cross-sectional view showing a configuration example of the display panel PNL shown in FIG. 3. The first substrate SUB1 comprises a transparent substrate (first insulating substrate) 10, wiring lines 11, an insulating layer 12, pixel electrodes 13 and an alignment film 14. The second substrate SUB2 comprises a transparent substrate (second insulating substrate) 20, a common electrode 21 and an alignment film 22. The transparent substrates 10 and 20 are insulating substrates such as glass substrates or plastic substrates. The wiring lines 11 are formed of a nontransparent metal material such as molybdenum, tungsten, aluminum, titanium, or silver. The illustrated wiring lines 11 extend in the first direction X but may extend in the second direction Y. The insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed in the respective pixels PX. The common electrode 21 is disposed across the pixels PX. The alignment films 14 and 22 may be horizontal alignment films having an alignment restriction force substantially parallel to the X-Y plane or may be vertical alignment films having an alignment restriction force substantially parallel to the third direction Z.

The liquid crystal layer 30 is located between the alignment film 14 and the alignment film 22. The liquid crystal layer 30 comprises polymer dispersed liquid crystal which includes polymers 31 and liquid crystal molecules 32. For example, the polymers 31 are liquid crystal polymers. The polymers 31 can be obtained by, for example, polymerizing liquid crystal monomers in the state of being aligned in a predetermined direction by the alignment restriction force of the alignment films 14 and 22. For example, the alignment treatment direction of the alignment films 14 and 22 is the first direction X, and the alignment films 14 and 22 have an alignment restriction force in the first direction X. For this reason, the polymers 31 are formed in the shape of a streak extending in the first direction X. The liquid crystal molecules 32 are dispersed in the gaps between the polymers 31 and are aligned such that major axes thereof extend in the first direction X.

Both the polymers 31 and the liquid crystal molecules 32 have optical anisotropy or refractive anisotropy. The liquid crystal molecules 32 may be positive liquid crystal molecules having positive dielectric anisotropy or may be negative liquid crystal molecules having negative dielectric anisotropy. The polymers 31 and the liquid crystal molecules 32 differ from each other in responsivity to an electric field. The responsivity of the polymers 31 to an electric field is lower than the responsivity of the liquid crystal molecules 32 to an electric field. In the enlarged portion in the drawing, the polymers 31 are shown by upward diagonal lines and the liquid crystal molecules 32 are shown by downward diagonal lines.

Figure 5:
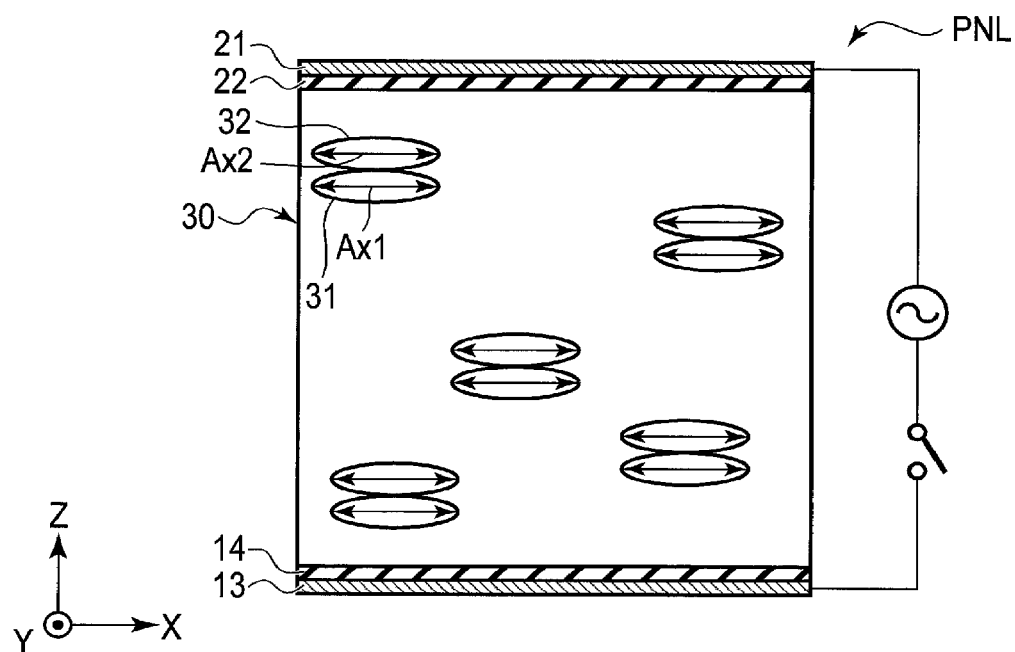
FIG. 5 is a schematic view showing a liquid crystal layer 30 in an off state.

FIG. 5 is a schematic view showing the liquid crystal layer 30 in an off state. The drawing shows a cross-section of the liquid crystal layer 30 in an X-Z plane intersecting the second direction Y which is the traveling direction of the light from the light source unit LU. The off state corresponds to a state in which no voltage is applied to the liquid crystal layer 30 (for example, a state in which the potential difference between the pixel electrode 13 and the common electrode 21 is approximately zero). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially equal refractive anisotropy. That is, the ordinary refractive index of the polymer 31 and the ordinary refractive index of the liquid crystal molecule 32 are substantially equal to each other, and the extraordinary refractive index of the polymer 31 and the extraordinary refractive index of the liquid crystal molecule 32 are substantially equal to each other. For this reason, hardly any refractive index difference exists between the polymer 31 and the liquid crystal molecule 32 in all directions including the first direction X, the second direction Y and the third direction Z.

Figure 6:
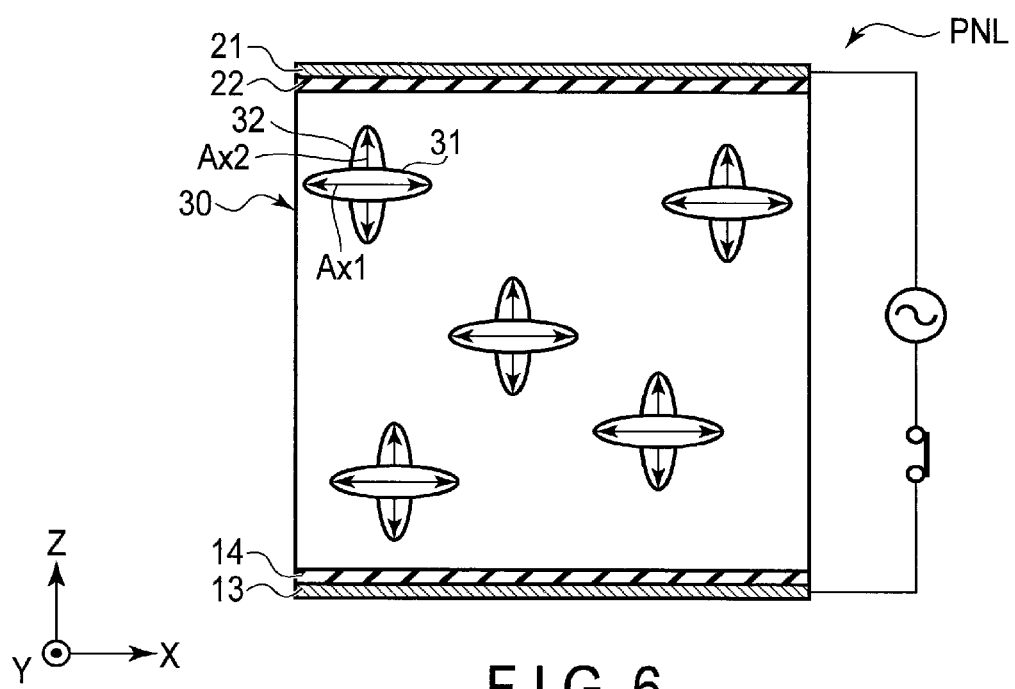
FIG. 6 is a schematic view showing the liquid crystal layer 30 in an on state.

FIG. 6 is a schematic view showing the liquid crystal layer 30 in an on state. The on state corresponds to a state in which voltage is applied to the liquid crystal layer 30 (for example, a state in which the potential difference between the pixel electrode 13 and the common electrode 21 is greater than or equal to a threshold value). As described above, the responsivity of the polymer 31 to an electric field is lower than the responsivity of the liquid crystal molecule 32 to an electric field. For example, the alignment direction of the polymer 31 hardly changes regardless of whether an electric field exists or not. On the other hand, the alignment direction of the liquid crystal molecule 32 changes in accordance with an electric field when high voltage which is greater than the threshold value is applied to the liquid crystal layer 30. That is, as shown in the drawing, the optical axis Ax1 is substantially parallel to the first direction X, whereas the optical axis Ax2 is inclined with respect to the first direction X. If the liquid crystal molecules 32 are positive liquid crystal molecules, the liquid crystal molecules 32 are aligned such that major axes thereof extend along an electric field. The electric field between the pixel electrode 13 and the common electrode 21 is formed in the third direction Z. Therefore, the liquid crystal molecules 32 are aligned such that major axes thereof or the optical axes Ax2 extend in the third direction Z. That is, the optical axis Ax1 and the optical axis Ax2 intersect each other. Therefore, a large refractive index difference exists between the polymer 31 and the liquid crystal molecule 32 in all directions including the first direction X, the second direction Y and the third direction Z.

FIG. 7 is a cross-sectional view showing the display panel PNL in a case where the liquid crystal layer 30 is in the off state. A light beam L11 emitted from the light-emitting element LS is made incident on the display panel PNL from the end portion E22 and propagates through the transparent substrate 20, the liquid crystal layer 30, the transparent substrate 10 and the like. If the liquid crystal layer 30 is in the off state, the light beam L11 is transmitted and hardly scattered in the liquid crystal layer 30. The light beam L11 propagates through the display panel PNL and hardly leaks from a lower surface 10B of the transparent substrate 10 and an upper surface 20T of the transparent substrate 20. That is, the liquid crystal layer 30 is in a transparent state.

External natural light L12 which is made incident on the display panel PNL is transmitted and hardly scattered in the liquid crystal layer 30. In other words, natural light made incident on the display panel PNL from the lower surface 10B is transmitted through the upper surface 20T, and natural light made incident on the display panel PNL from the upper surface 20T is transmitted through the lower surface 10B. For this reason, when the user observes the display panel PNL from the upper surface 20T side, the user can visually recognize a background on the lower surface 10B side through the display panel PNL. Similarly, when the user observes the display panel PNL from the lower surface 10B side, the user can visually recognize a background on the upper surface 20T side through the display panel PNL.

FIG. 8 is a cross-sectional view showing the display panel PNL in a case where the liquid crystal layer 30 is in the on state. A light beam L21 emitted from the light-emitting element LS is made incident on the display panel PNL from the end portion E22 and propagates through the transparent substrate 20, the liquid crystal layer 30, the transparent substrate 10, and the like. In the example illustrated, the liquid crystal layer 30 overlapping a pixel electrode 13A is in the off state and the liquid crystal layer 30 overlapping a pixel electrode 13B is in the on state. For this reason, the light beam L21 is transmitted and hardly scattered in an area of the liquid crystal layer 30 which overlaps the pixel electrode 13A, and the light beam L21 is scattered in an area of the liquid crystal layer 30 which overlaps the pixel electrode 13B. Of the light beam L21, some scattered light beams L211 are transmitted through the upper surface 20T, some scattered light beams L212 are transmitted through the lower surface 10B, and the other scattered light beams propagate through the display panel PNL.

In the area overlapping the pixel electrode 13A, natural light L22 made incident on the display panel PNL is transmitted and hardly scattered in the liquid crystal layer 30 similarly to the natural light L12 shown in FIG. 7. In the area overlapping the pixel electrode 13B, when natural light L23 is made incident from the lower surface 10B, part of the natural light L23 is scattered in the liquid crystal layer 30 and part of the natural light L23, namely, light L231 is transmitted through the upper surface 20T. In addition, when natural light L24 is made incident from the upper surface 20T, part of the natural light L24 is scattered in the liquid crystal layer 30 and part of the natural light L24, namely, light L241 is transmitted through the lower surface 10B. For this reason, when the user observes the display panel PNL from the upper surface 20T side, the user can visually recognize the color of the light beam L21 in the area overlapping the pixel electrode 13B. In addition, since the light L231 is transmitted through the display panel PNL, the user can visually recognize the background on the lower surface 10B side through the display panel PNL. Similarly, when the user observes the display panel PNL from the lower surface 10B side, the user can visually recognize the color of the light beam L21 in the area overlapping the pixel electrode 13B. In addition, since the light L241 is transmitted through the display panel PNL, the user can visually recognize the background on the upper surface 20T side through the display panel PNL. In the area overlapping the pixel electrode 13A, since the liquid crystal layer 30 is in the transparent state, the user hardly recognize the color of the light beam L21 and the user can visually recognize the background through the display panel PNL.

Next, a more specific configuration example will be described.

Figure 9:
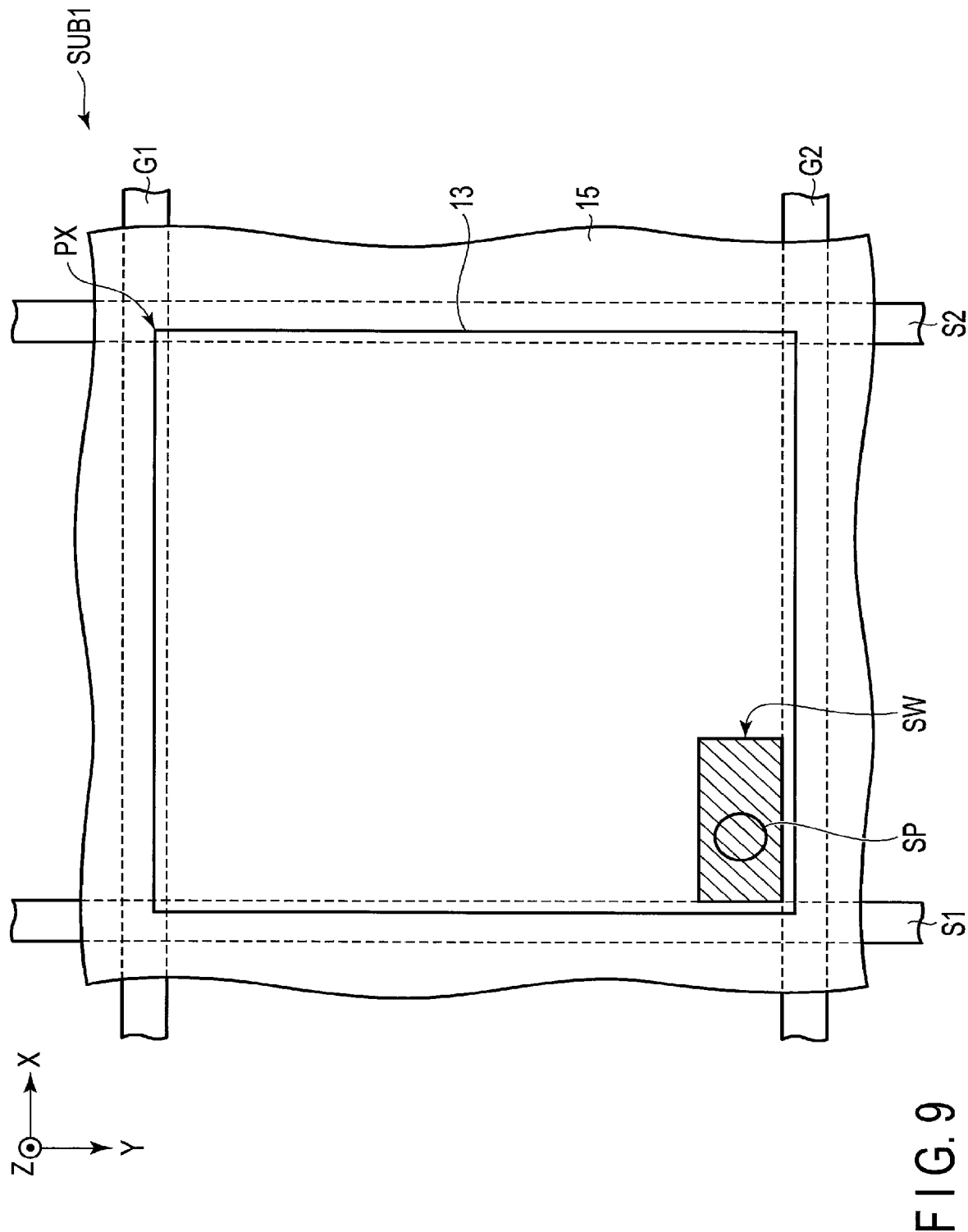
FIG. 9 is a plan view showing an example of a pixel PX in a first substrate SUB1.

FIG. 9 is a plan view showing an example of the pixel PX in the first substrate SUB1. In the example illustrated, the pixel PX is partitioned with two signal lines S1 and S2 arranged in the first direction X and two scanning lines G1 and G2 arranged in the second direction Y. The pixel PX comprises the switching element SW and the pixel electrode 13. The switching element SW is, for example, a thin-film transistor and is electrically connected to the scanning line G2 and the signal line S1. Although a specific configuration of the switching element SW will be described later, the switching element SW may be a bottom-gate type in which a gate electrode is located below a semiconductor layer or may be a top-gate type in which a gate electrode is located above a semiconductor layer. The semiconductor layer is formed of, for example, amorphous silicon but may be formed of polycrystalline silicon or an oxide semiconductor. The pixel electrode 13 is electrically connected to the switching element SW. Further, the pixel electrode 13 overlaps a capacitive electrode 15. The capacitive electrode 15 is disposed across the pixels PX and further disposed across substantially the entire area of the first substrate SUB1. The capacitive electrode 15 overlaps the switching element SW, the scanning lines G1 and G2 and the signal lines S1 and S2. In the example illustrated, a spacer SP overlaps the switching element SW and forms a predetermined cell gap between the first substrate SUB1 and the second substrate SUB2.

Figure 10:
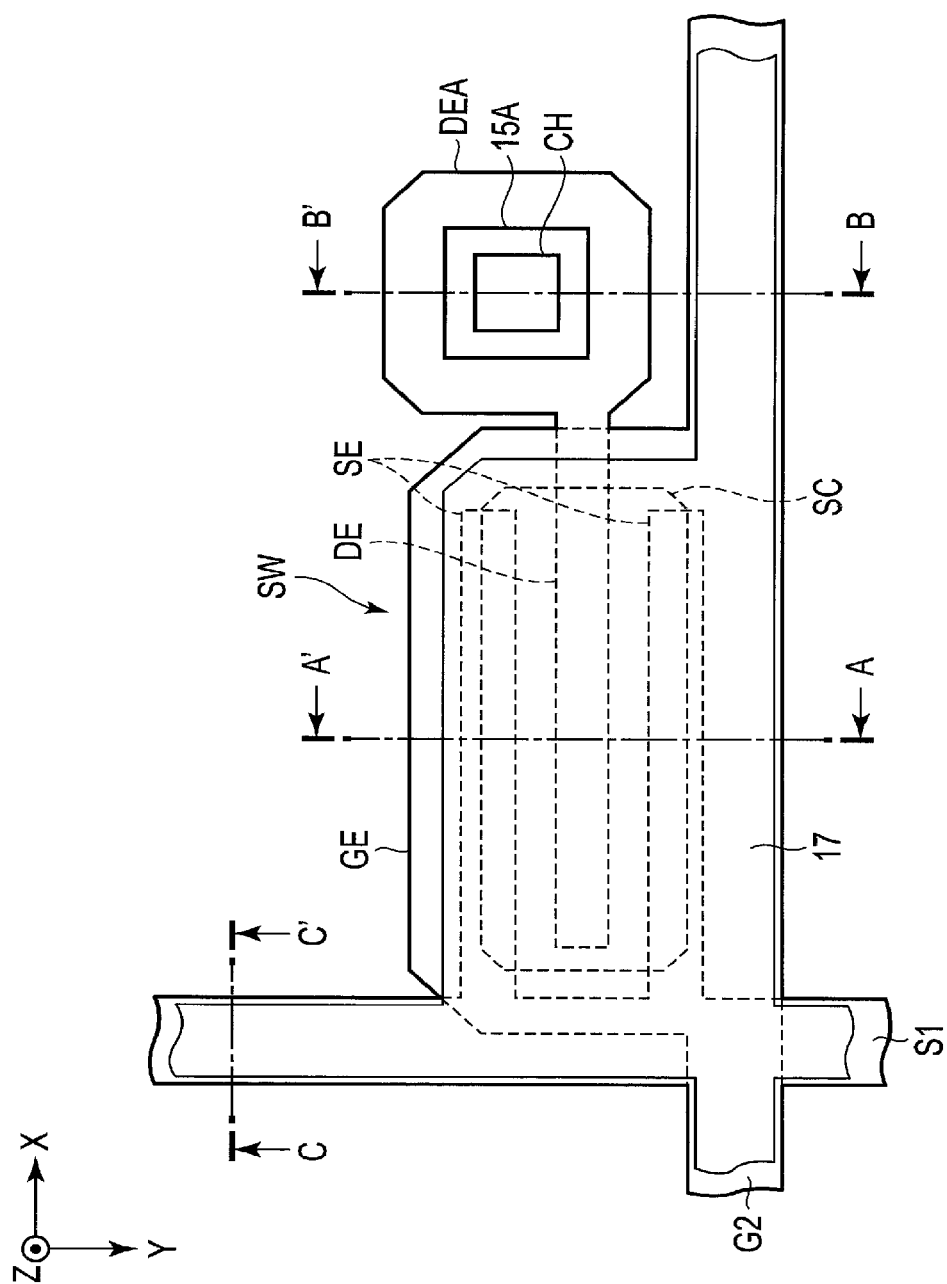
FIG. 10 is an enlarged plan view showing an example of a switching element SW shown in FIG. 9.

FIG. 10 is an enlarged plan view showing an example of the switching element SW shown in FIG. 9. The switching element SW comprises a gate electrode GE, source electrodes SE and a drain electrode DE. The gate electrode GE is formed integrally with the scanning line G2. The semiconductor layer SC overlaps the gate electrode GE. Two source electrodes SE are formed integrally with the signal line S1 and are in contact with the semiconductor layer SC. The drain electrode DE is located between the two source electrodes SE and is in contact with the semiconductor layer SC. The drain electrode DE has a connection portion DEA connected to the pixel electrode 13 shown in FIG. 9. The connection portion DEA overlaps an opening portion 15A formed in the capacitive electrode 15 and a contact hole CH. A light-shielding layer 17 overlaps the scanning line G2 and the signal line S1. The light-shielding layer 17 further overlaps the switching element SW, in particular, the source electrodes SE, the drain electrode DE, and the semiconductor layer SC. In addition, a light-shielding layer 23 provided in the second substrate SUB2, which will be described later, overlaps the scanning line G2, the signal line S1 and the switching element SW similarly to the light-shielding layer 17.

Figure 11:
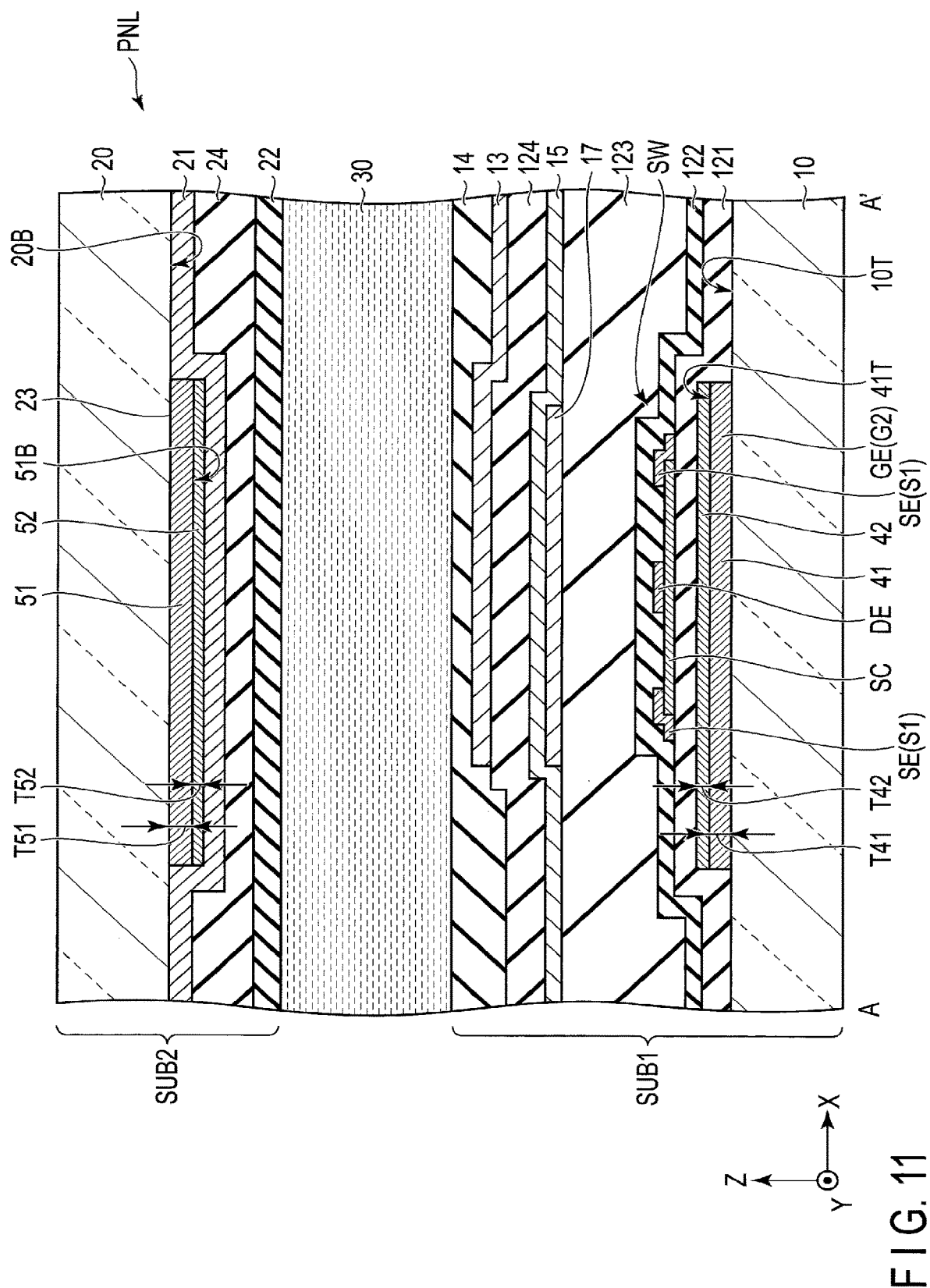
FIG. 11 is a cross-sectional view showing the display panel PNL which is taken along line A-A' and includes the switching element SW shown in FIG. 10.

FIG. 11 is a cross-sectional view showing the display panel PNL which is taken along line A-A' and includes the switching element SW shown in FIG. 10.

In the first substrate SUB1, the gate electrode GE which is formed integrally with the scanning line G2 is located on the transparent substrate 10 and corresponds to, for example, the wiring line 11 shown in FIG. 4. An insulating layer 121 covers the gate electrode GE and the scanning line G2 and is in contact with an upper surface 10T of the transparent substrate 10. The semiconductor layer SC is located on the insulating layer 121 directly above the gate electrode GE. The two source electrodes SE which are formed integrally with the signal line S1 are in contact with the semiconductor layer SC and are partly located on the insulating layer 121. The drain electrode DE is in contact with the semiconductor layer SC. An insulating layer 122 covers the semiconductor layer SC, the source electrodes SE, the drain electrode DE and the insulating layer 121. An insulating layer 123 covers the insulating layer 122. The light-shielding layer 17 is located on the insulating layer 123 directly above the semiconductor layer SC, the source electrodes SE and the drain electrode DE. The capacitive electrode 15 covers the insulating layer 123 and the light-shielding layer 17. The light-shielding layer 17 is in contact with the capacitive electrode 15 and is electrically connected to the capacitive electrode 15. An insulating layer 124 covers the capacitive electrode 15. The pixel electrode 13 is located on the insulating layer 124. The pixel electrode 13 and the capacitive electrode 15 are opposed to each other via the insulating layer 124 and form storage capacitance which is required for image display in the pixel PX. The alignment film 14 covers the pixel electrode 13 and the insulating layer 124.

The insulating layers 121 to 124 correspond to, for example, the insulating layer 12 shown in FIG. 4. The insulating layers 121, 122, and 124 are formed of, for example, a transparent inorganic insulating material such as silicon nitride or silicon oxide. The insulating layer 123 is formed of, for example, a transparent organic insulating material such as acrylic resin.

The gate electrode GE and the scanning line G2 comprise a reflective layer (first reflective layer) 41 which is opposed to the transparent substrate 10 and a conductive layer 42 which is located between the transparent substrate 10 and the liquid crystal layer 30. The reflective layer 41 is located between the transparent substrate 10 and the conductive layer 42. In the example illustrated, the reflective layer 41 is in contact with the upper surface 10T of the transparent substrate 10. A transparent insulating layer may be interposed between the transparent substrate 10 and the reflective layer 41. However, no thin film having an optical absorbance higher than that of the reflective layer 41 is interposed between the transparent substrate 10 and the reflective layer 41. The conductive layer 42 is located between the reflective layer 41 and the liquid crystal layer 30. In the example illustrated, the conductive layer 42 is stacked on an upper surface 41T of the reflective layer 41 and is opposed to the semiconductor layer SC via the insulating layer 121.

Each of the reflective layer 41 and the conductive layer 42 is formed of a metal material, but the reflective layer 41 and the conductive layer 42 are formed of different metal materials. The reflective layer 41 is formed of a metal material having a reflectance higher than that of the conductive layer 42. In one example, the reflective layer 41 is formed of aluminum and the conductive layer 42 is formed of molybdenum. The reflective layer 41 is not limited to aluminum and may be formed of a metal material having a relatively high reflectance such as titanium or silver.

The reflective layer 41 and the conductive layer 42 have a thickness T41 and a thickness T42, respectively, in the third direction Z. The thickness T41 is greater than the thickness T42. In one example, the thickness T41 is ten or more times greater than the thickness T42.

The source electrodes SE, the drain electrode DE, and the light-shielding layer 17 have, for example, a multilayer structure in which a plurality of conductive layers are stacked. In one example, the source electrodes SE and the like have a multilayer structure in which a conductive layer including molybdenum (Mo), a conductive layer including aluminum (Al), and a conductive layer including molybdenum (Mo) are stacked in this order. However, the source electrodes SE and the like do not necessarily have this structure and may have a multilayer structure in which a conductive layer including titanium (Ti), a conductive layer including aluminum (Al), and a conductive layer including titanium (Ti) are stacked in this order.

The capacitive electrode 15 is formed of a transparent conductive material such as ITO or IZO.

In the second substrate SUB2, the light-shielding layer 23 is located below the transparent substrate 20 and is also located directly above the switching element SW or directly above the gate electrode GE and the scanning line G2. The common electrode 21 covers the light-shielding layer 23 and is in contact with a lower surface 20B of the transparent substrate 20. The common electrode 21 is electrically connected to the capacitive electrode 15 and is at the same potential as the capacitive electrode 15. The common electrode 21 is opposed to the pixel electrode 13 via the liquid crystal layer 30. An overcoat layer 24 covers the common electrode 21. The alignment film 22 covers the overcoat layer 24. The liquid crystal layer 30 is in contact with the alignment films 14 and 22.

The light-shielding layer 23 comprises a reflective layer (third reflective layer) 51 opposed to the transparent substrate 20 and a conductive layer 52 located between the transparent substrate 20 and the liquid crystal layer 30. The reflective layer 51 is located between the transparent substrate 20 and the conductive layer 52. In the example illustrated, the reflective layer 51 is in contact with the lower surface 20B of the transparent substrate 20. No thin film having an optical absorbance higher than that of the reflective layer 51 is interposed between the transparent substrate 20 and the reflective layer 51. The conductive layer 52 is located between the reflective layer 51 and the liquid crystal layer 30. In the example illustrated, the conductive layer 52 is stacked on a lower surface 51B of the reflective layer 51 and is in contact with the common electrode 21.

The reflective layer 51 and the conductive layer 52 are formed of different metal materials. The reflective layer 51 is formed of a metal material having a reflectance higher than that of the conductive layer 52. In one example, the reflective layer 51 is formed of aluminum and the conductive layer 52 is formed of molybdenum. The reflective layer 51 is formed of a metal material having a relatively high reflectance such as titanium or silver.

A thickness T51 of the reflective layer 51 is greater than a thickness T52 of the conductive layer 52. In one example, the thickness T51 is ten or more times greater than the thickness T52.

Figure 12:
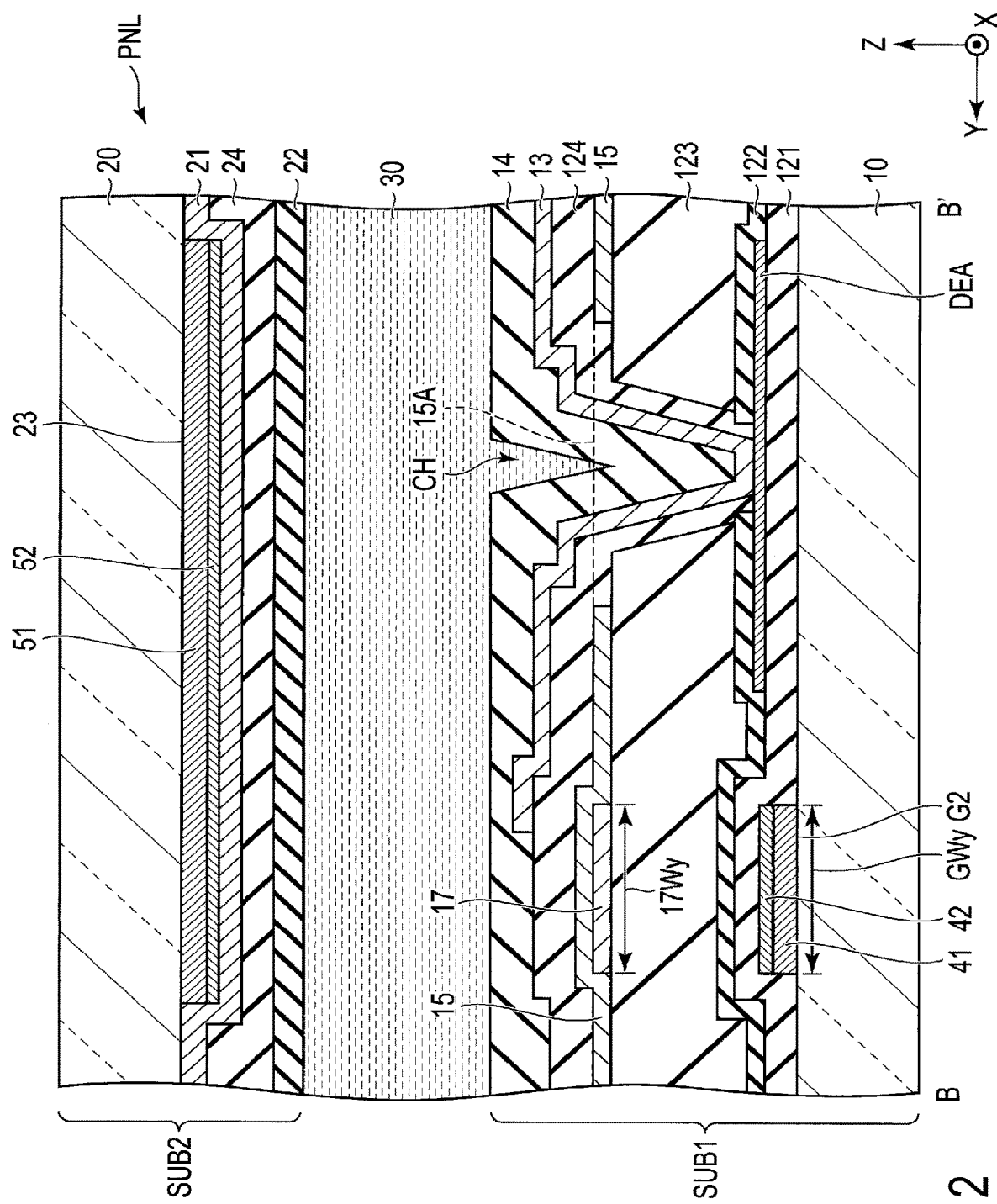
FIG. 12 is a cross-sectional view showing the display panel PNL which is taken along line B-B' and includes a scanning line G2 and a connection portion DEA shown in FIG. 10.

FIG. 12 is a cross-sectional view showing the display panel PNL which is taken along line B-B' and includes the scanning line G2 and the connection portion DEA shown in FIG. 10.

In the first substrate SUB1, similarly to the gate electrode GE shown in FIG. 11, the scanning line G2 comprises the reflective layer 41 which is in contact with the transparent substrate 10 and the conductive layer 42 which is stacked on the reflective layer 42. The connection portion DEA is located on the insulating layer 121 and is covered with the insulating layer 122. The pixel electrode 13 is in contact with the connection portion DEA in the contact hole CH penetrating the insulating layers 122 to 124 and in the opening portion 15A of the capacitive electrode 15. The light-shielding layer 17 is located directly above the scanning line G2. A width 17Wy of the light-shielding layer 17 in the second direction Y is greater than or substantially equal to a width GWy of the scanning line G2 in the second direction Y.

In the second substrate SUB2, the light-shielding layer 23 is located directly above the scanning line G2 and the connection portion DEA.

Figure 13:
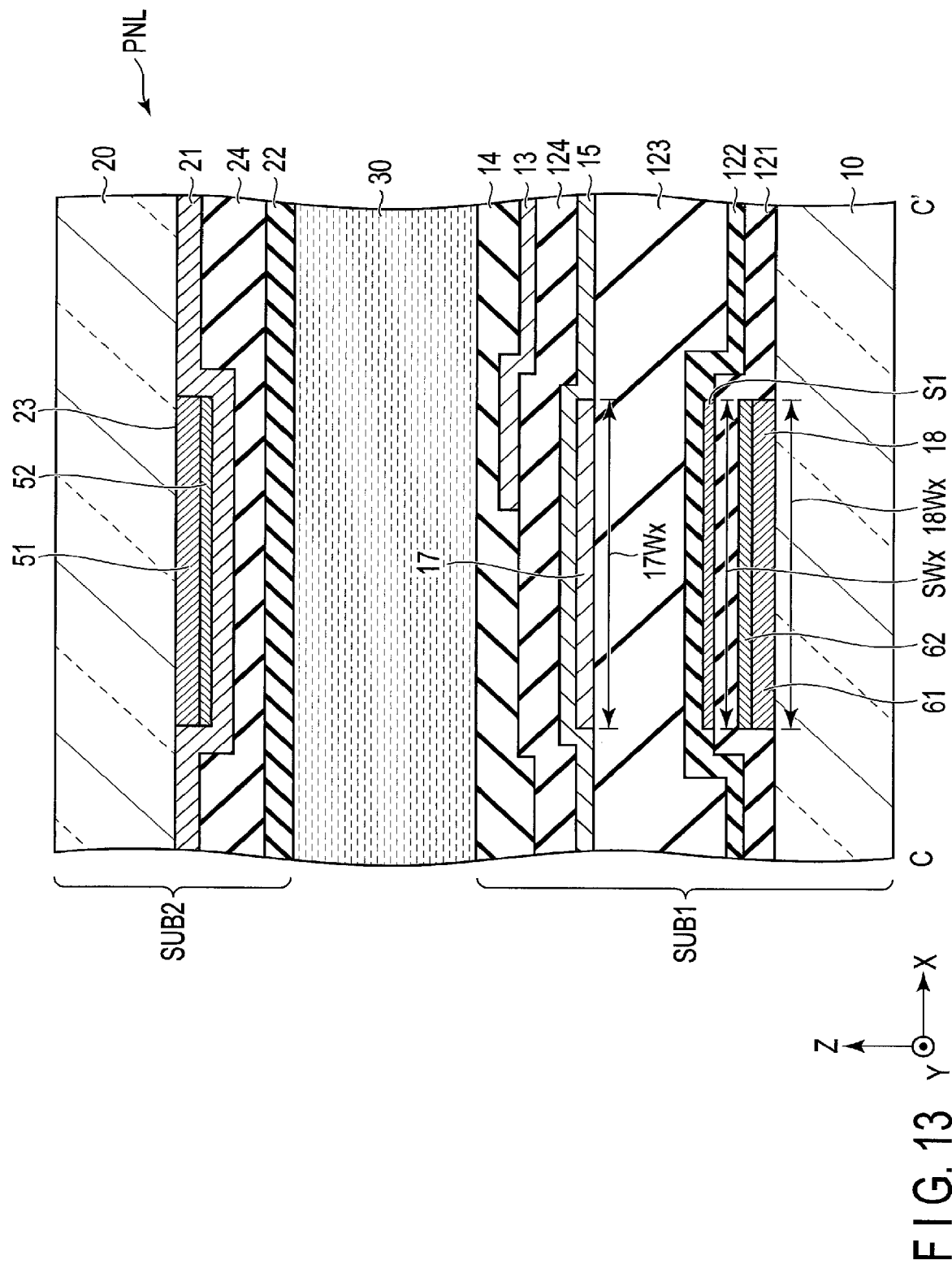
FIG. 13 is a cross-sectional view showing the display panel PNL which is taken along line C-C' and includes a signal line S1 shown in FIG. 10.

FIG. 13 is a cross-sectional view showing the display panel PNL which is taken along line C-C' and includes the signal line S1 shown in FIG. 10.

In the first substrate SUB1, a light-shielding layer 18 is located between the transparent substrate 10 and the signal line S1. In the example illustrated, the light-shielding layer 18 is located between the transparent substrate 10 and the insulating layer 121. That is, the light-shielding layer 18 is located in the same layer as the scanning line G2 and the gate electrode GE described with reference to FIG. 11, etc. The light-shielding layer 18 is electrically insulated from the scanning line G2 and the gate electrode GE. The light-shielding layer 18 comprises at least a reflective layer (second reflective layer) 61 similarly to the scanning line G2, etc. The light-shielding layer 18 comprises a conductive layer 62 stacked on the reflective layer 61 in the example illustrated, but the conductive layer 62 may be omitted. The reflective layer 61 is in contact with the transparent substrate 10, is located in the same layer as the reflective layer 41 and is formed of the same material as the reflective layer 41. The conductive layer 62 is located in the same layer as the conductive layer 42 and is formed of the same material as the conductive layer 42.

The signal line S1 is located directly above the light-shielding layer 18 via the insulating layer 121. The light-shielding layer 17 is located directly above the signal line S1. A width 17Wx of the light-shielding layer 17 in the first direction X is greater than or substantially equal to a width SWx of the signal line S1 in the first direction X. In addition, a width 18Wx of the light-shielding layer 18 in the first direction X is greater than or substantially equal to the width SWx of the signal line S1. The light-shielding layer 18 may be omitted and the signal line S1 may comprise a reflective layer which is in contact with the insulating layer 121.

In the second substrate SUB2, the light-shielding layer 23 is located directly above the signal line S1.

Figure 14:
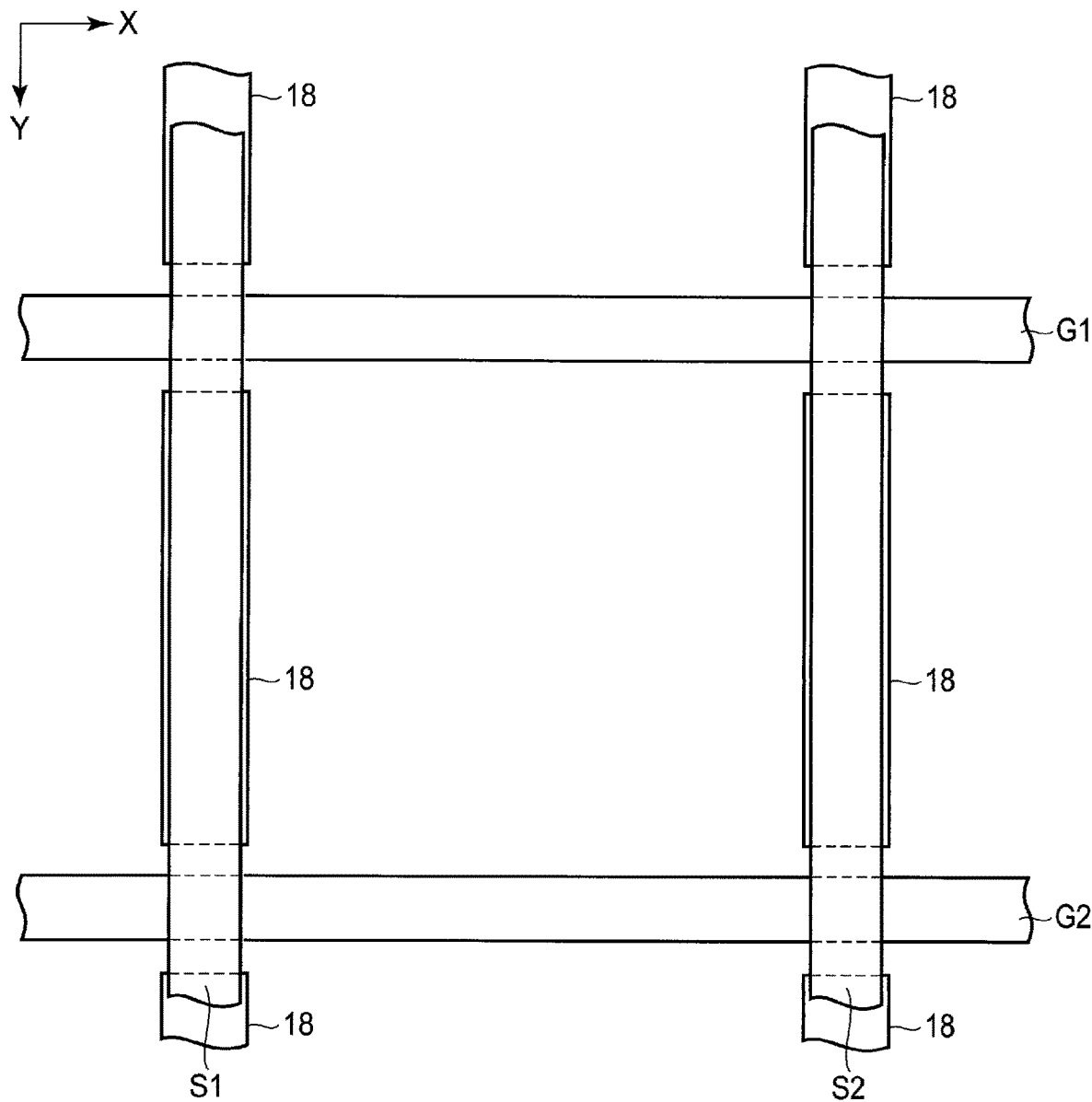
FIG. 14 is a plan view showing signal lines S1 and S2, scanning lines G1 and G2 and a light-shielding layer 18.

FIG. 14 is a plan view showing the signal lines S1 and S2, the scanning lines G1 and G2 and the light-shielding layers 18.

The light-shielding layers 18 are located in the same layer as the scanning line G2 as described with reference to FIGS. 12 and 13. The scanning lines G1 and G2 extend in the first direction X, and the light-shielding layers 18 extend in the second direction Y and overlap the signal lines S1 and S2. The light-shielding layers 18 are separated from the scanning lines G1 and G2 near the intersections of the signal lines S1 and S2 and the scanning lines G1 and G2. Therefore, the light-shielding layers 18 are not connected to any wiring lines and are put in an electrically floating state.

FIG. 15 is an explanatory diagram showing the way the light emitted from the light-emitting element LS propagates through the display panel PNL.

As shown by arrows in the drawing, the light emitted from the light-emitting element LS is attenuated as the light propagates farther from the end portion E22 which is an incidence portion. Since the optical absorbance in the transparent substrates 10 and 20 is less than 0.1%, the main cause of the attenuation of the emitted light is the light absorption in the respective thin films between the transparent substrate 10 and the transparent substrate 20.

In particular, wiring portions located near the transparent substrates 10 and 20 (such as the scanning line, the signal line and the switching element) may include a thin film having a relatively high optical absorbance. In one example, a thin film formed of molybdenum has an optical absorbance of more than 40%. For this reason, if the molybdenum layer faces the transparent substrates 10 and 20, the light transmitted through the transparent substrates 10 and 20 is absorbed into the molybdenum layer, and the light is attenuated.

According to the present embodiment, the gate electrode GE of the switching element SW and the scanning line G comprise the reflective layer 41 facing the transparent substrate 10, and the light-shielding layer 18 located between the signal line S and the transparent substrate 10 comprises the reflective layer 61 facing the transparent substrate 10. For this reason, hardly any light absorptive layer facing the transparent substrate 10 exists in the first substrate SUB1. Therefore, the light transmitted through the transparent substrate 10 and reaching the wiring portions is reflected and hardly absorbed in the reflective layers 41 and 61.

In addition, the light-shielding layer 23 comprises the reflective layer 51 facing the transparent substrate 20. For this reason, hardly any light absorptive layer facing the transparent substrate 20 exists in the second substrate SUB2. Therefore, the light transmitted through the transparent substrate 20 and reaching the light-shielding layer 23 is reflected and hardly absorbed in the reflective layer 51.

Consequently, the absorption of the light propagating through the display panel PNL into the thin films can be prevented, and the attenuation of the light can be suppressed. As a result, the light from the light-emitting element LS reaches the pixels PX which are located far from the incidence portion in the display area DA, and the degradation of display quality can be suppressed.

FIG. 16 is a graph showing the result of luminance measurement in the display device DSP of the present embodiment and a display device of a comparative example.

In the display device of the comparative example, a wiring portion in a first substrate SUB1 comprises a molybdenum layer facing a transparent substrate 10. On the other hand, the display device DSP of the present embodiment differs from the display device of the comparative example in that the wiring portion comprises the reflective layer formed of aluminum and facing the transparent substrate 10 as described above. The luminance of the display device was measured while the distance from the incidence portion was changed. The horizontal axis of FIG. 16 represents a distance from the incidence portion, and the vertical axis of FIG. 16 represents a relative luminance value. As shown in the drawing, according to the display device DSP of the present embodiment, as compared to the display device of the comparative example, the reduction of luminance is small even if the distance from the incident portion is large, and the attenuation of light can be suppressed.

As described above, a display device capable of suppressing degradation of display quality can be provided by the present embodiment.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:
1. A display device comprising:
a first substrate comprising a first insulating substrate, a scanning line, a signal line intersecting the scanning line, a switching element electrically connected to the scanning line and the signal line, and a pixel electrode electrically connected to the switching element;
a second substrate comprising a second insulating substrate and a common electrode opposed to the pixel electrode; and
a liquid crystal layer provided between the first substrate and the second substrate and including a polymer in a shape of a streak and a liquid crystal molecule, wherein
the scanning line comprises:
a conductive layer; and
a first reflective layer located between the first insulating substrate and the conductive layer, the first substrate further comprises a second reflective layer located between the first insulating substrate and the signal line, the second reflective layer along the signal line is in the same layer as the first reflective layer, the second substrate further comprises a third reflective layer and a second conductive layer, the second conductive layer is stacked on the third reflective layer, the third reflective layer is located between the second insulating substrate and the second conductive layer, the third reflective layer and the second conductive layer are formed of different metal materials, and the third reflective layer overlaps the scanning line and the signal line.

2. The display device of claim 1, wherein
the switching element comprises a gate electrode formed integrally with the scanning line, and
the gate electrode comprises the first reflective layer.

3. The display device of claim 1, wherein the third reflective layer is in contact with the common electrode.

4. The display device of claim 1, wherein the third reflective layer is in contact with the second insulating substrate.

5. The display device of claim 1, wherein
the first reflective layer is in contact with an upper surface of the first insulating substrate,
the conductive layer is in contact with an upper surface of the first reflective layer, and
the first reflective layer is thicker than the conductive layer.

6. The display device of claim 1, wherein
the first substrate further comprises a light-shielding layer, and
the light-shielding layer extends between the scanning line and the liquid crystal layer, between the signal line and the liquid crystal layer and between the switching element and the liquid crystal layer.

7. The display device of claim 6, wherein
the first substrate further comprises a capacitive electrode, and
the capacitive electrode is in contact with the light-shielding layer.

8. The display device of claim 6, wherein
the light-shielding layer has a first width above the scanning line,
the first width of the light-shielding layer is greater than or substantially equal to a width of the scanning line,
the light-shielding layer has a second width above the signal line, and
the second width of the light-shielding layer is greater than or substantially equal to a width of the signal line.

9. The display device of claim 1, further comprising a light-emitting element opposed to an end portion of at least one of the first substrate and the second substrate.

10. A display device comprising:
a first substrate comprising a first insulating substrate, a conductive layer and a reflective layer;
a second substrate comprising a second insulating substrate; and
a liquid crystal layer provided between the first substrate and the second substrate and including a polymer in a shape of a streak and a liquid crystal molecule, wherein
the conductive layer includes a scanning line and a signal line intersecting the scanning line and is located between the first insulating substrate and the liquid crystal layer, the reflective layer includes a first reflective layer and a second reflective layer, the second substrate further comprises a third reflective layer and a second conductive layer, the second conductive layer is stacked on the third reflective layer, the third reflective layer is located between the second insulating substrate and the second conductive layer, the third reflective layer and the second conductive layer are formed of different metal materials, and the third reflective layer overlaps the scanning line and the signal line.

11. The display device of claim 10, wherein
the reflective layer is in contact with an upper surface of the first insulating substrate,
the conductive layer is in contact with an upper surface of the reflective layer, and
the reflective layer is thicker than the conductive layer.

12. The display device of claim 11, wherein a thickness of the reflective layer is ten or more times greater than a thickness of the conductive layer.

13. The display device of claim 11, wherein
the first substrate further comprises a light-shielding layer, and
the light-shielding layer is located directly above the conductive layer.

14. A display device comprising:
a first substrate comprising a first insulating substrate, a scanning line including a conductive layer and a first reflective layer located between the first insulating substrate and the conductive layer, a signal line intersecting the scanning line, a switching element electrically connected to the scanning line and the signal line, and a pixel electrode electrically connected to the switching element, a second reflective layer located between the first insulating substrate and the signal line;
a second substrate comprising a second insulating substrate and a common electrode opposed to the pixel electrode;
a liquid crystal layer provided between the first substrate and the second substrate and including a polymer in a shape of a streak and a liquid crystal molecule; and
a light-emitting element arranged at an end portion of the second substrate,
wherein
the second reflective layer along the signal line is in the same layer as the first reflective layer,
the second substrate further comprises a third reflective layer and a second conductive layer,
the second conductive layer is stacked on the third reflective layer,
the third reflective layer is located between the second insulating substrate and the second conductive layer,
the third reflective layer and the second conductive layer are formed of different metal materials, and
the third reflective layer overlaps the scanning line and the signal line.

15. The display device of claim 14, wherein the third reflective layer is in contact with the common electrode.

16. The display device of claim 14, wherein
the first substrate further comprises a capacitive electrode.

17. The display device of claim 16, wherein
the first substrate further comprises a light-shielding layer, and
the light-shielding layer extends between the scanning line and the liquid crystal layer, between the signal line and the liquid crystal layer and between the switching element and the liquid crystal layer.

18. The display device of claim 17, wherein the light-shielding layer has a first width above the scanning line, the first width of the light-shielding layer is greater than or substantially equal to a width of the scanning line, the light-shielding layer has a second width above the signal line, and the second width of the light-shielding layer is greater than or substantially equal to a width of the signal line.

* * * * *